United States Patent [19]

Yamasaki et al.

[11] Patent Number: 4,524,627
[45] Date of Patent: Jun. 25, 1985

[54] ELECTROMAGNETIC FLOW METER

[75] Inventors: Hiro Yamasaki, Tokyo; Tung Jin Chin, Yokohama; Chuji Akiyama, Kawasaki, all of Japan

[73] Assignee: Yokogawa Hokushin Electric Corporation, Tokyo, Japan

[21] Appl. No.: 509,799

[22] Filed: Jun. 30, 1983

[30] Foreign Application Priority Data

Jul. 3, 1982 [JP] Japan ................ 57-115870

[51] Int. Cl.$^3$ ............................................. G01F 1/60
[52] U.S. Cl. ........................................... 73/861.12
[58] Field of Search .................. 73/861.12–861.17

[56] References Cited

U.S. PATENT DOCUMENTS

| 2,733,604 | 2/1956 | Coulter | 73/861.12 |
| 3,411,355 | 11/1968 | Cushing | 73/861.14 |
| 3,999,443 | 12/1976 | Appel et al. | 73/861.17 |

FOREIGN PATENT DOCUMENTS 684312  9/1979  U.S.S.R. .................. 73/861.13

Primary Examiner—Charles A. Ruehl
Attorney, Agent, or Firm—Cushman, Darby & Cushman

[57] ABSTRACT

An electromagnetic flow meter includes a fluid-carrying conduit. A signal detecting element detects an electromotive force induced in the fluid in the conduit to produce a first detecting signal. A conduit voltage detecting element detects a voltage of the conduit to produce a second detecting signal. An electrical energy applying device is responsive to the first and second detecting signals for applying a selected amount of voltage to the conduit so that the voltage of the first detecting signal and the detected voltage of the conduit become equal to each other, whereby a profile of the voltage of the conduit is substantially similar to a profile of the electromotive force at least at a position of the signal detecting element.

9 Claims, 19 Drawing Figures

FIG. 4 (Prior Art)
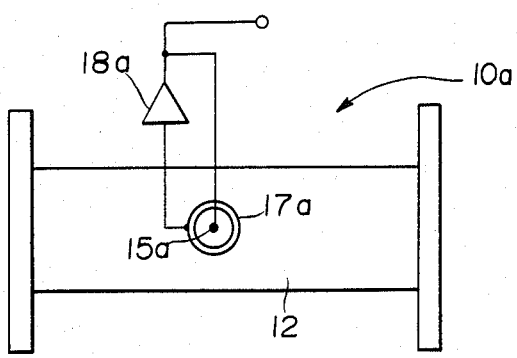
FIG. 5 (Prior Art)
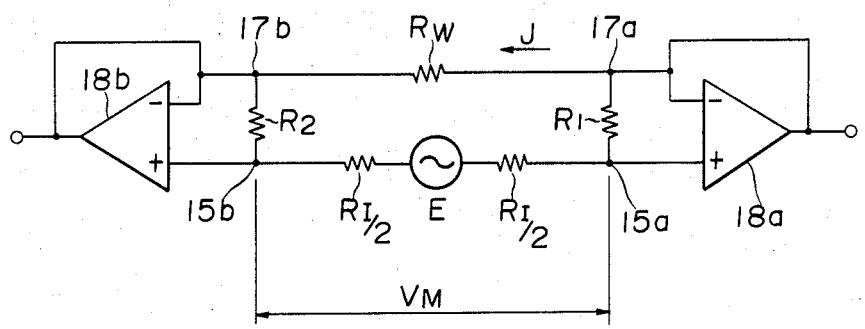
(Prior Art) FIG. 6A          FIG. 6B (Prior Art)
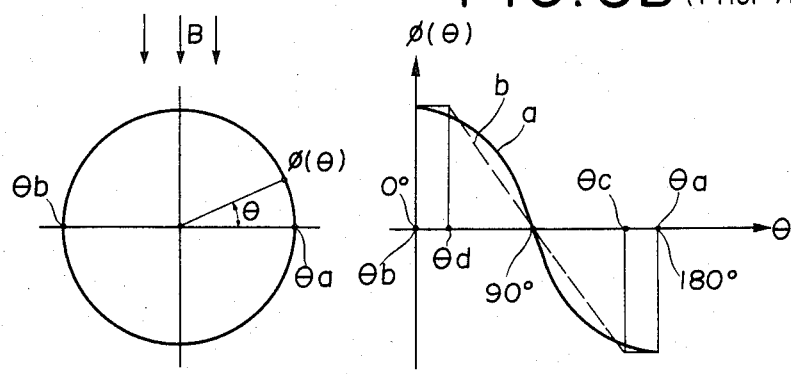

ELECTROMAGNETIC FLOW METER

BACKGROUND OF THE INVENTION

1. Field of the Invention

This invention relates to electromagnetic flow meters.

2. Prior Art

One conventional flow meter 10 of the electromagnetic type shown in FIG. 1 comprises a fluid-carrying conduit 11 including a pipe 12 of a conductive material and a lining 13 of an insulating material such as polytetrafluoroethylene mounted on the internal surface of the pipe 12. A magnetic field B produced by a magnetic field generating means (shown by a coil) is exerted on the conduit 11 so that an electromotive force E is induced in the fluid 14 flowing through the conduit 11. A pair of diametrically opposed measuring electrodes or probes 15a and 15b are mounted on the conduit 11, and the voltage between the electrodes 15a and 15b is detected to measure the flow rate of the fluid through the conduit 11.

The operation of this conventional electromagnetic flow meter will now be described with reference to an equivalent circuit of the flow meter (FIG. 2). In FIG. 2, E denotes an electromotive force proportional to the flow rate of the fluid, and $R_I$ denotes an internal impedance of the fluid 14, and $R_W$ denotes an impedance representing the total of an impedance at the boundary between the fluid 14 and the conduit 11 and an impedance of the conduit 11. Also, $V_M$ denotes a potential difference between the measuring electrodes 15a and 15b, that is to say, an output voltage of the electromagnetic flow meter. Using this equivalent circuit, the output voltage $V_M$ is represented by the following formula:

$$V_M = \frac{R_W}{R_I + R_W} E \quad (1)$$

In this case, since the lining 13 is made of an insulating material, the following formula is obtained:

$$R_W >> R_I \quad (2)$$

Then, the following formula is obtained from the formulas (1) and (2):

$$V_M \approx E \quad (3)$$

Thus, the output voltage $V_M$ of the electromagnetic flow meter is substantially equal to the electromotive force E proportional to the flow rate of the fluid.

This conventional flow meter 10 of the electromagnetic type have the following disadvantages because of the use of the lining 13:

(a) Since the lining 13 of a uniform thickness has to be mounted on the internal surface of the pipe 12, the manufacture of the flow meter requires much labor and cost.

(b) It is necessary that the lining 13 should have an adequate mechanical strength as well as a corrosion resistance, a wear resistance and a thermal resistance. Therefore, generally, the lining 13 is made of a polymeric material such as polytetrafluoroethylene and rubber. However, the lining made of such a material has failed to meet the above-mentioned requirements satisfactorily.

(c) When a fluid of a conductive nature is deposited on the internal surface of the lining 3, the impedance $R_W$ is lowered so that the formula (2) ($R_W >> R_I$) is not established. As a result, the formula (3) is also not established so that the output voltage $V_M$ is not proportional to the flow rate of the fluid. Therefore, the flow rate can not be measured accurately.

In order to overcome such disadvantages arising from the use of the lining, there have been proposed electromagnetic flow meters having no lining. One such flow meter 10a is shown in FIGS. 3 and 4, and FIG. 5 shows an equivalent circuit of the flow meter 10a. The electromagnetic flow meter 10a comprises an electrical energy applying means which includes a pair of annular auxiliary electrodes 17a and 17b of copper and a pair of amplifiers 18a and 18b each having a voltage gain of 1. The pair of auxiliary electrodes 17a and 17b are welded to a pipe 12 and surround measuring electrodes or probes 15a and 15b, respectively. The measuring electrode 15a, 15b is connected to one input terminal of the amplifier 18a, 18b while the auxiliary electrode 17a, 17b is connected to the other input terminal of the amplifier 18a, 18b and to the output terminal thereof. With this arrangement, the voltage of the measuring electrode 15a, 15b is rendered equal to the voltage of the auxiliary electrode 17a, 17b. Therefore, as shown in FIG. 5, no current flows through the impedance $R_1$ between the measuring electrode 15a and the auxiliary electrode 17a and also through the impedance $R_2$ between the measuring electrode 15b and the auxiliary electrode 17b. Therefore, no current flows through a path constituted by the impedance $R_1$, the impedance $R_W$ of the pipe 12 and the impedance $R_2$. As a result, the output voltage $V_M$ of the electromagnetic flow meter 10a is equal to the electromotive force E which is proportional to the flow rate of the fluid 14. In other words, the output voltage $V_M$ of the flow meter is proportional to the flow rate of the fluid 14, so that the flow rate can be measured. The amplifiers 18a and 18b function to cause an output current J to flow through a path extending therebetween and containing the impedance $R_W$, the output voltage $V_M$ is not affected by the output current J.

Coordinates shown in FIG. 6A indicates the relation between the pipe 12 and a detecting point on the internal surface of the pipe 12 when a magnetic field is applied in a plane perpendicular to the longitudinal axis of the pipe, with the pipe having a uniform thickness. FIG. 6B is a diagrammatic illustration showing the relation between the detecting point and the voltage at the detecting point. The voltage at the detecting point determined by an angle $\theta$ is indicated by $\phi$. A profile of the voltage induced in the fluid 14 at the internal surface of the pipe of the flow meter 10 is shown in a solid line a in the diagrammatic illustration on FIG. 6A. Also, a profile of the voltage produced at the internal surface of the pipe of the flow meter 10a having no lining is shown in a broken line b in the diagrammatic illustration of FIG. 6B. In FIGS. 6A and 6B, the positions of the measuring electrodes 15a and 15b are indicated by $\theta a$ and $\theta b$, respectively. The positions of the auxiliary electrodes 17a and 17b are indicated by $\theta c$ and $\theta d$, respectively. Thus, in the prior art, the flow meter having no lining can properly measure the flow rate of the fluid by causing the cosine wave-shaped voltage profile indicated by the solid line a to approximate the angularly-bent voltage profile indicated by the broken line b. In this case, it is important that the voltage at those portions of the pipe internal surface adjacent to the measuring electrodes 15a and 15b should be equal to the voltage of those portions of the fluids adjacent to said those portions of the pipe internal surface. In other words, in FIG. 6B, the voltage profile a must coincide with the voltage profile b when $\theta$ is 0° and 180°.

In the electromagnetic flow meter 10a, the output current J of a large magnitude is caused to flow through the auxiliary electrodes 17a and 17b welded to the pipe 12, so that voltage drops develop at the welding portions, thereby rendering the measurement of the flow rate inaccurate. This will now be described with reference to FIG. 7 in which $V_M$ denotes the output voltage of the measuring electrode 15a, $V_2$ denotes the output voltage of the amplifier 18a, $V_3$ denotes a voltage applied to the auxiliary electrode, and $V_4$ denotes a voltage of the portion of the pipe 12 adjacent to the measuring electrode 15a. Since the amplifier 18a has a voltage gain of 1, the following formula is obtained:

$$V_M = V_2 = V_3 \quad (4)$$

Thus, the output voltage $V_M$ is equal to the voltage $V_3$ applied to the auxiliary electrodes 17a. In this condition, output current J of the amplifier 18a flows through the auxiliary electrode 17a into the pipe 12, so that a voltage drop develops at the welded portion between the auxiliary electrode 17a and the pipe 12. As a result, the voltage $V_4$ becomes smaller than the voltage $V_3$ by an amount equal to this voltage drop. Therefore, the following formula is obtained:

$$V_4 < V_3 \quad (5)$$

Further, the following formula is obtained from the formulas (4) and (5):

$$V_4 < V_M \quad (6)$$

Thus, the voltage $V_4$ of the pipe 12 becomes smaller than the output voltage $V_M$ of the detecting electrode 15a, thereby giving rise to an error in the measurement of the flow rate. As is clear from the foregoing, an accurate measurement of the flow rate can be made when the output voltage $V_M$ of the measuring electrode 15a is equal to the voltage $V_4$ of the pipe 12.

This phenomenon also occurs at the side of the measuring electrode 15b. In conclusion, in the electromagnetic flow meter 10a in FIG. 3, it is necessary that the output voltage $V_M$ should be equal to the voltage $V_4$ of the pipe 12 in order to achieve an accurate measurement of the flow rate. Actually, however, by making the output voltage $V_M$ equal to the voltage $V_3$, it is assumed that the voltage $V_M$ is equal to the voltage $V_4$. As mentioned above, the voltage profile a coincides with the voltage profile b when $\theta$ is 0° and 180° (FIG. 6B). However, this can be achieved only when the voltage drops at the welding portions of the auxiliary electrodes 17a and 17b are ignored. With the conventional electromagnetic flow meter, it is impossible that the voltage profile a coincides with the voltage profile b accurately.

U.S. Pat. No. 2,733,604 discloses another electromagnetic flow meter which comprises a pair of probes mounted on a fluid-carrying conduit having no lining, one of the probes being connected to an amplifier in the form of a pentode constituting a cathode follower while the other probe is grounded. The one probe detects a voltage of the fluid in the conduit to send a detecting signal to the amplifier which in turn sends an output voltage through an auto-transformer, which serves to correct the output voltage, to plate-like auxiliary electrodes mounted on the internal surface of the conduit. With this construction, a profile of the voltage of the fluid in the vicinity of the one probe coincides with a profile of the voltage of the auxiliary electrodes. This flow meter is disadvantageous in that the voltage of the one probe and the voltage of the auxiliary electrodes do not coincide with each other when external conditions vary, because no feed-back loop is established. Another disadvantage is that the coincidence of the probe voltage with the auxiliary electrode voltage must be made by manipulating a slider of a variable resistor of the auto-transformer, which is rather troublesome.

SUMMARY OF THE INVENTION

It is therefore an object of this invention to provide an electromagnetic flow meter which can measure the flow rate of a fluid accurately.

According to the present invention, there is provided an electromagnetic flow meter comprising a conductive conduit through which a fluid flows; means for applying a magnetic field to the conduit to induce an electromotive force in the fluid; signal detecting means for detecting the electromotive force induced in the fluid to produce a first detecting signal; means disposed in the vicinity of the signal detecting means for detecting a voltage of the conduit to produce a second detecting signal; electrical energy applying means responsive to the first and second detecting signals for applying a selected amount of voltage to the conduit so that the voltage of the first detecting signal and the detected voltage of the conduit become equal to each other, whereby a profile of the voltage of the conduit is substantially similar to a profile of the electromotive force at least at a position of the signal detecting means.

BRIEF DESCRIPTION OF THE DRAWINGS

FIG. 4 is a schematic front elevational of the flow meter of FIG. 3;

FIG. 5 is a circuit diagram of the flow meter of FIG. 3,

FIG. 6A is a diagrammatic illustration showing the relation between a pipe and a detecting point on an internal surface of the pipe;

FIG. 6B is a diagrammatic illustration showing the relation between the detecting point and the voltage at the detecting point;

DESCRIPTION OF THE PREFERRED EMBODIMENTS OF THE INVENTION

Figure 8:
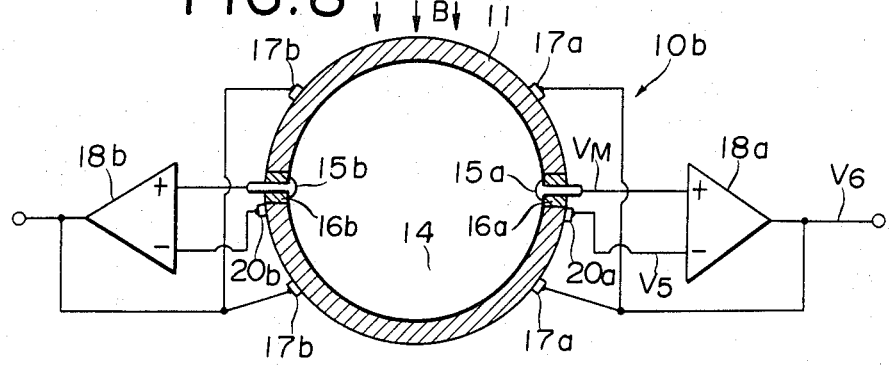
FIG. 8 is a cross-sectional view of an electromagnetic flow meter provided in accordance with the present invention.
Figure 9:
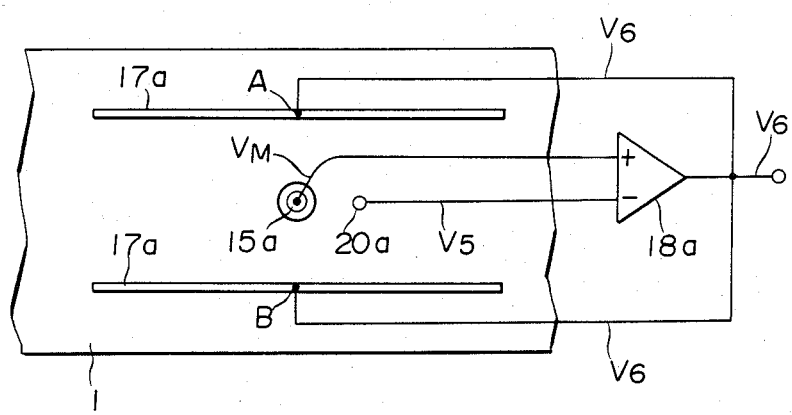
FIG. 9 is a front elevational view of the flow meter of FIG. 8.

An electromagnetic flow meter 10b shown in FIGS. 8 and 9 comprise a fluid-carrying conduit 11 in the form of a conductive pipe and a pair of diametrically-opposed measuring electrodes 15a and 15b mounted on the conduit 11 through insulating members 16a and 16b. A pair of electrodes 20a and 20b are mounted on the conduit 11 adjacent to respective measuring electrodes 15a and 15b and spaced therefrom in the axial direction of the conduit 11. The detecting electrodes 20a and 20b serve to detect the voltages at the portions of the conduits where they are mounted, that is, the voltages $V_5$ at the portions of the conduit 11 adjacent to the measuring electrodes 15a and 15b. A pair of elongated auxiliary electrodes 17a and 17a are mounted on the conduit 11 and extend in the axial direction of the conduit 11, the electrodes 17a and 17a being circumferentially spaced equidistantly from the measuring electrode 15a. Another pair of elongated auxiliary electrodes 17b and 17b are mounted on the conduit 11 and extend in the axial direction of the conduit, the electrodes 17b and 17b being circumferentially spaced equidistantly from the measuring electrode 15b. The measuring electrode 15a, 15b is connected to one input terminal of amplifier 18a, 18b, and the detecting electrode 20a, 20b is connected to the other input terminal of the amplifier 18a, 18b. The output terminal of the amplifier 18a, 18b is connected to the auxiliary electrodes 17a, 17b. With this arrangement, the amplifier 18a, 18b applies an output voltage $V_6$ to the auxiliary electrodes 17a, 17b so that the voltage $V_5$ is equal to the voltage $V_M$. The auxiliary electrodes 17a, 17b and the amplifier 18a, 18b constitute an electrical energy applying means. A pair of diametrically opposed grounding electrodes (not shown) are mounted on the conduit 11 and disposed in a plane perpendicular to the plane in which the measuring electrodes 15a and 15b lie, the grounding electrodes being disposed respectively between one of the electrodes 15a and one of the electrodes 15b and between the other electrode 15a and the other electrode 15b.

With this construction, no current flows through the measuring electrode 15a, 15b and the conduit voltage detecting electrode 20a, 20b, so that they are not subjected to a voltage drop. Therefore, although current flows through the auxiliary electrode 17a, 17b so that it is subjected to a voltage drop, the voltage $V_M$ of each of the measuring electrodes 15a and 15b accurately coincides with the voltage $V_5$ of each of the detecting electrodes 20a and 20b. In other words, the voltage $V_5$ of the detecting electrode 20a, 20b accurately represents the voltage at that portion of the conduit 11 adjacent to the measuring electrode 15a, 15b, and the voltage at said that portion of the conduit 11 is equal to the voltage $V_M$ of the measuring electrode 15a, 15b. The requirement that the voltage $V_M$ is equal to the voltage at the portion of the conduit 11 adjacent to the measuring electrode 15a, 15b is essential for the electromagnetic flow meter having no lining to carry out an accurate measurement of the flow rate of the fluid 14 through the conduit 11. Thus, the electromagnetic flow meter 10b in FIGS. 8 and 9 can effect an accurate measurement of the flow rate.

Figure 1:
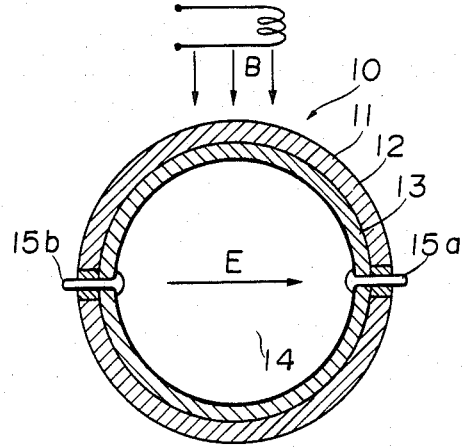
FIG. 1 is a cross-sectional view of a conventional electromagnetic flow meter having a lining.
Figure 2:
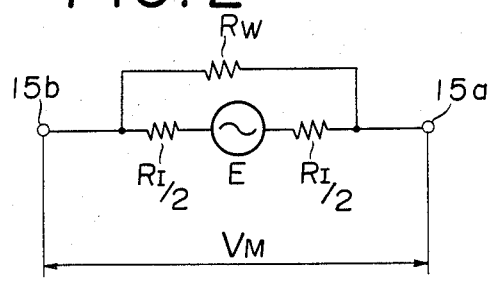
FIG. 2 is a circuit diagram of an equivalent circuit of the flow meter of FIG. 1.
Figure 3:
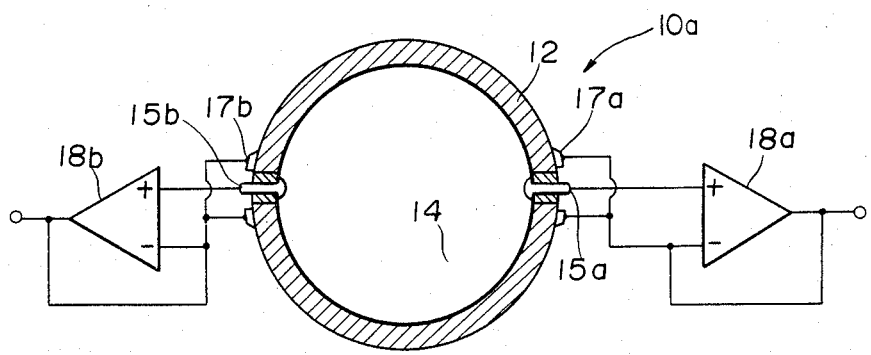
FIG. 3 is another conventional electromagnetic flow meter having no lining.
Figure 7:
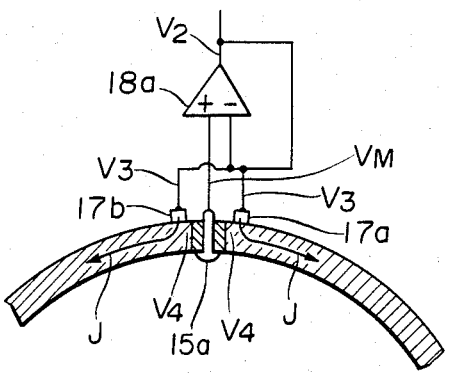
FIG. 7 is a fragmentary view of the flow meter of FIG. 3.
Figure 10:
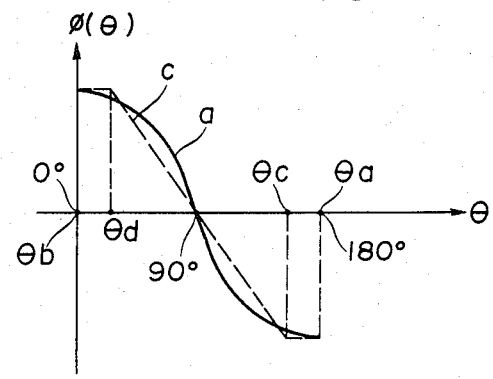
FIG. 10 is an illustration similar to FIG. 6A but representing the present invention.

Preferably, points A and B of the auxiliary electrodes 17a to which the amplifying voltage $V_6$ is supplied from the amplifier 18a are disposed in a plane which is disposed perpendicular to the longitudinal axis of the conduit 11 and contains the measuring electrode 15a. Referring to FIG. 9 in this respect, the point A, the measuring electrode 15a and the point B are disposed in alignment with one another. Also, the points of the auxiliary electrodes 17b to which the amplifying voltage is supplied from the amplifier 18b are disposed in the same manner described for the points A and B. With this arrangement, a conduit voltage profile is produced symmetrically with respect to the plane in which the measuring electrode 15a, 15b lie. The voltage profile of the electromagnetic flow meter 10b is shown in an diagrammatic illustration of FIG. 10 in which a broken line c represents a profile of voltage produced in the conduit 11. A solid line a represents a profile of the voltage induced in the fluid at the internal surface of the pipe 12 of the electromagnetic flow meter 10 of FIG. 1 having the lining 13. As is seen from FIG. 10, the voltage profile c and the voltage profile a coincide with each other accurately when $\theta$ is 0° and 180°.

The conduit voltage detecting electrode 20a can be disposed at any position between the auxiliary electrodes 17a and 17a, and similarly the other detecting electrode 20b can be disposed at any position between the auxiliary electrodes 17b and 17b.

Figure 11:
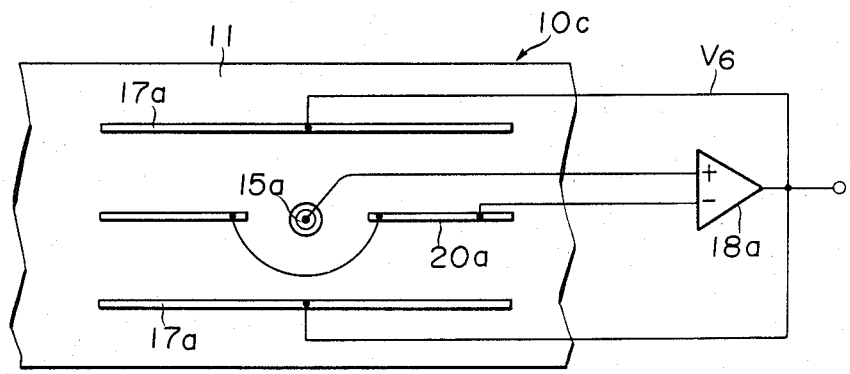
FIGS. 11 to 18 are views showing modified electromagnetic flow meters.

FIG. 11 shows a modified electromagnetic flow meter 10c which differs from the electromagnetic flow meter 10b in that each of the conduit voltage detecting electrodes 20a and 20b is replaced by a pair of longitudinally spaced electrodes 20c and 20c between which measuring electrode 15a, 15b is disposed, the spaced electrodes 20c and 20c being connected together by an electrical lead 23.

Figure 12:
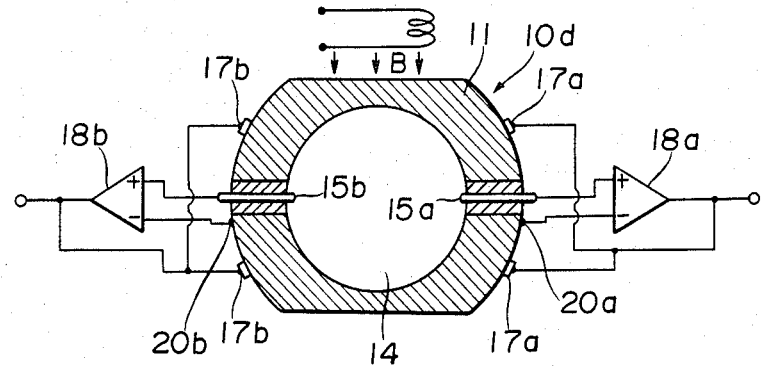

FIG. 12 shows another modified electromagnetic flow meter 10d which differs from the electromagnetic flow meter 10b of FIG. 8 in that a conduit 11 is cut away at diametrically opposed portions, so that the conduit wall varies in thickness at these portions. With this arrangement, an apparent conductivity of the conduit 11 varies circumferentially of the conduit. Therefore, the voltage profile of the conduit 11 and the voltage profile of the fluid 14 resemble each other both in the vicinity of the measuring electrodes 15a and 15b and at positions spaced from the electrodes 15a and 15b. In other words, referring to FIG. 10, the voltage profile c approaches the voltage profile a even when $\theta$ is not 0° and 180°. These two voltage profiles of course coincide with each other when $\theta$ is 0° and 180°. Therefore, this flow meter 10d can measure the flow rate more accurately.

Figure 13:
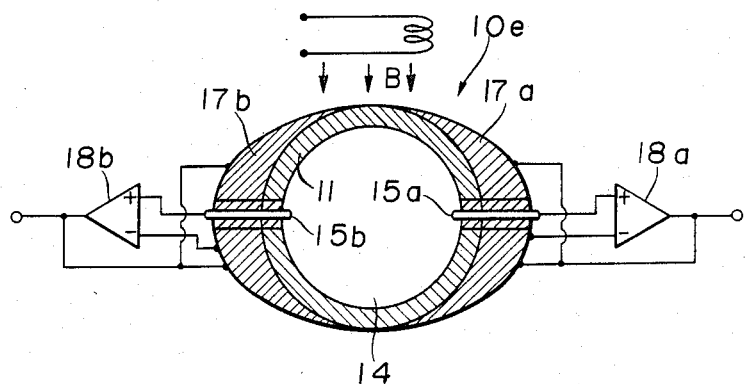

FIG. 13 shows a further modified electromagnetic flow meter 10e which achieves the same effect as the electromagnetic flow meter 10d of FIG. 12. In this embodiment, each pair of auxiliary electrodes 17a and 17b have a half crescent shape. Thus, since the thickness of the auxiliary electrodes varies circumferentially of the conduit 11, the same effect that the conductivity of the conduit 11 is equivalently varied is achieved.

Figure 14:
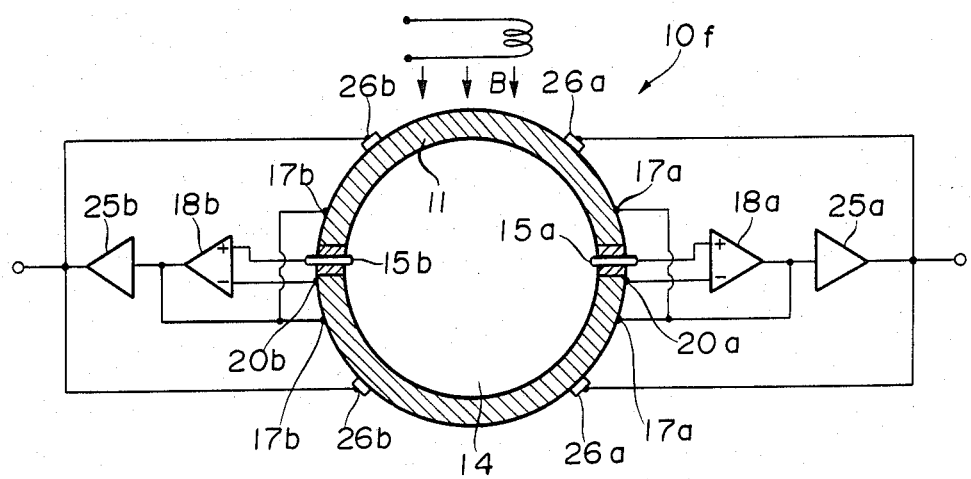

FIG. 14 shows a still further modified electromagnetic flow meter 10f which differs from the electromagnetic flow meter 10b of FIG. 8 in that a pair of additional amplifiers 25a and 25b and two pairs of additional auxiliary electrodes 26a and 26b are provided. An output voltage of the amplifier 25a is applied to the electrodes 26a and 26a so that the voltage of the conduit 11 and the voltage of the fluid 14 at the auxiliary electrodes 26a and 26a become equal to each other. Also, an output voltage of the amplifier 25b is applied to the electrodes 26b and 26b for the same purposes. Therefore, the voltage profile of the conduit 11 resembles the voltage profile of the fluid 14 even at positions spaced from the measuring electrodes 15a and 15b, so that the flow rate can be measured more accurately.

Figure 15:
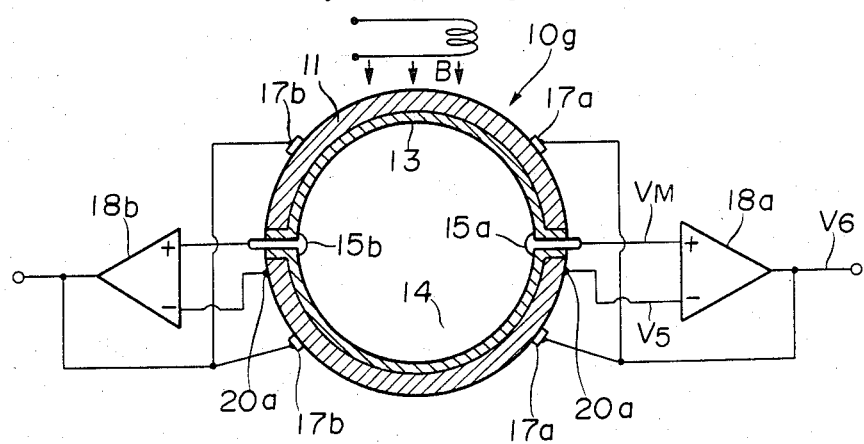

FIG. 15 shows a further modified electromagnetic flow meter 10g which differs from the electromagnetic flow meter 10b of FIG. 8 in that a lining 13 is mounted on the internal surface of conduit 12. Also, the electromagnetic flow meters in the preceding embodiments may have a lining mounted internally of conduit 12. Such electromagnetic flow meters having the conduit lining can properly measure the flow rate of the fluid even when the lining is subjected to damage.

Figure 16:
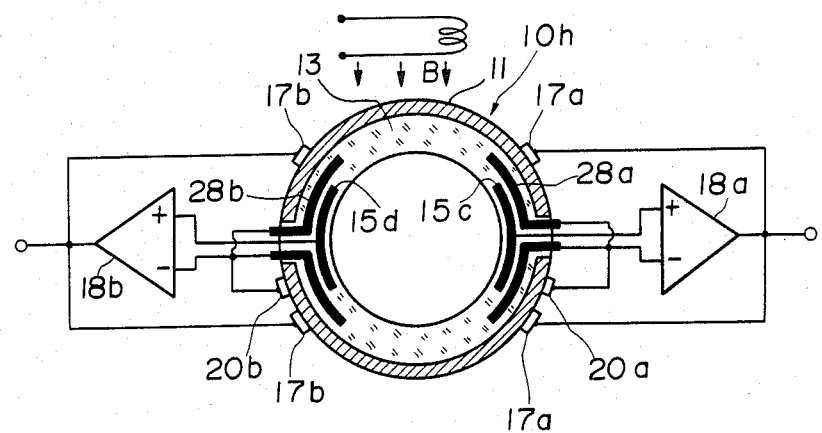
Figure 17:
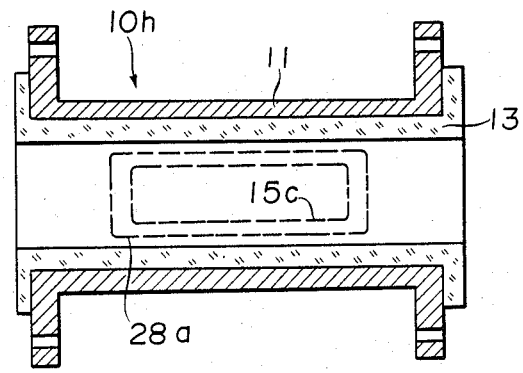

FIGS. 16 and 17 show a further modified electromagnetic flow meter 10h which differs from the electromagnetic flow meter 10b of FIG. 8 in that a pair of generally rectangular measuring electrodes 15c and 15d are mounted in a lining 13 in insulating relation to conduit 12 and that a pair of guard electrodes 28a and 28b are mounted in the lining 13 in surrounding relation to the respective measuring electrodes. The guard electrodes 28a and 28b are connected to conduit voltage detecting electrodes 20a and 20b, respectively. Thus, in this embodiment, the measuring electrodes 15c and 15d are not in contact with the fluid 14 in the conduit 12 and are disposed in capacitive coupling relation to the fluid to detect the flow rate thereof.

As described above, according to the present invention, a selected amount of voltage is applied to the conduit so that the voltage detected by the measuring electrodes and the voltage detected by the conduit voltage detecting electrodes become equal to each other. Therefore, the profile of the conduit voltage resembles the profile of the fluid voltage in the vicinity of the measuring electrodes. As a result, the flow rate of the fluid through the conduit can be measured accurately.

Figure 18:
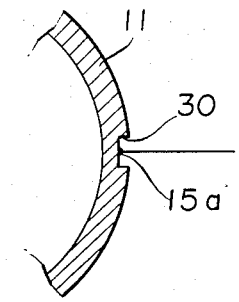

While the electromagnetic flow meters according to the present invention have been specifically shown and described herein, the invention itself is not restricted by the exact showing of the drawings or the description thereof. For example, each of the measuring electrodes 15a and 15b may be mounted on a recess 30 in the conduit, as shown in FIG. 18.

What is claimed is:

1. An electromagnetic flow meter comprising:
   (a) a conductive conduit through which a fluid flows;
   (b) means for applying a magnetic field to said conduit to induce an electromotive force in said fluid;
   (c) signal detecting means for detecting the electromotive force induced in said fluid to produce a first detecting signal;
   (d) means disposed in the vicinity of said signal detecting means for detecting a voltage of said conduit to produce a second detecting signal;
   (e) electrical energy applying means responsive to said first and second detecting signals for applying a selected amount of voltage to said conduit so that the voltage of said first detecting signal and the said detected voltage of said conduit become equal to each other, whereby a profile of the voltage of said conduit is substantially similar to a profile of said electromotive force at least at a position of said signal detecting means.

2. An electromagnetic flow meter according to claim 1, in which said conduit has a lining of an electrical insulating material mounted on the internal surface thereof.

3. An electromagnetic flow meter according to claim 2, in which said signal detecting means comprises a pair of diametrically opposed electrodes mounted within said lining in capacitive coupling relation to said fluid.

4. An electromagnetic flow meter according to claim 1, in which an apparent conductivity of said conduit varies circumferentially thereof.

5. An electromagnetic flow meter according to claim 1, in which said signal detecting means comprises a pair of diametrically opposed electrodes mounted on said conduit through electrical insulating means and disposed in contact with said fluid.

6. An electromagnetic flow meter according to claim 1, in which said electrical energy applying means comprises a pair of elongated auxiliary electrodes mounted on said conduit for electrical connection thereto and extend along the axis of said conduit and an amplifier connected to said auxiliary electrodes for applying its output voltage thereto, said signal detecting means and said conduit voltage detecting means lying between said pair of auxiliary electrodes.

7. An electromagnetic flow meter according to claim 6, in which said auxiliary electrodes are provided in a plurality of pairs.

8. An electromagnetic flow meter according to claim 6, in which two points of said auxiliary electrodes to which the output voltage of said amplifier is applied are disposed in a plane which is disposed perpendicular to the longitudinal axis of said conduit and contains said signal detecting means.

9. An electromagnetic flow meter according to claim 1, in which said conduit voltage detecting means comprises an elongated electrode mounted on said conduit for electrical connection thereto and extending along the longitudinal axis thereof.

* * * * *